(12) United States Patent
Foley et al.

(10) Patent No.: US 6,548,198 B2
(45) Date of Patent: Apr. 15, 2003

(54) COMPACT PRECOOLER

(75) Inventors: Peter F. Foley, Manchester, CT (US); James R. Geschwindt, Waltham, MA (US); William T. Unkert, Tolland, CT (US); Antonio M. Vincitore, Manchester, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 217 days.

(21) Appl. No.: 09/736,868

(22) Filed: Dec. 15, 2000

(65) Prior Publication Data

US 2002/0076587 A1 Jun. 20, 2002

(51) Int. Cl.$^7$ ................................................ H01M 8/18
(52) U.S. Cl. .......................... 429/19; 429/17; 429/20; 429/24; 429/26; 429/34; 429/38; 429/39
(58) Field of Search .............................. 429/19, 20, 24, 429/26, 34, 38, 39, 17

(56) References Cited

U.S. PATENT DOCUMENTS

| | | | | |
|---|---|---|---|---|
| 3,982,962 A | * | 9/1976 | Bloomfield | .................. 429/19 |
| 4,004,947 A | | 1/1977 | Bloomfield | |
| 5,360,679 A | * | 11/1994 | Buswell et al. | ................ 429/19 |
| 5,516,344 A | * | 5/1996 | Corrigan | .................... 48/127.9 |
| 5,747,185 A | | 5/1998 | Hsu | |

* cited by examiner

*Primary Examiner*—Patrick Ryan
*Assistant Examiner*—Angela J. Martin
(74) *Attorney, Agent, or Firm*—Bachman & LaPointe, P.C.

(57) ABSTRACT

A precooler for use in a fuel cell system between a thermal reformer and a shift converter includes an atomizing water inlet in combination with a swirling inducing reformed gas inlet which act to increase the resistance time of the reformed gas in the precooler so as to effectively cool same.

14 Claims, 3 Drawing Sheets

COMPACT PRECOOLER

BACKGROUND OF THE INVENTION

The present invention relates to a fuel cell system and, more particularly, an auto-thermal reformer fuel cell system to produce electricity.

Fuel cell power plants for producing electricity are well known in the art. U.S. Pat. No. 3,976,507 discloses a pressurized fuel cell power plant which operates at a pressure greater than ambient pressure. While the power plant disclosed in U.S. Pat. No. 3,976,507 is effective and useful for generating electricity, the fact that the plant operates under pressure does not render it particularly useable for an auto-thermal reformer fuel cell system with vehicular applications. In a low pressure auto-thermal reformer fuel cell system, the size of the system and the pressure drop experienced during operation of the system are critical factors in producing an effective, compact system which is useable in vehicular applications.

Naturally, it would be highly desirable to produce an auto-thermal reformer fuel cell system which can operate effectively at ambient pressure while maintaining a compact size which is suitable for use in the system. In order to achieve the foregoing, each component in the auto-thermal reformer fuel cell system must be designed in a manner which takes into consideration the allowable pressure drop which may occur within the system and the sized limitation constraints necessary to make such a system practical. Therefore, any savings in size and pressure drop which can be obtained with any of the system components is highly desirable. Accordingly, it is a principal object of the present invention to provide a compact precooler which is useful in an auto-thermal reformer fuel cell system.

It is a particular object of the present invention to provide a compact precooler which is effective in reducing the temperature of a reformer exit gas stream while ensuring minimal pressure drop.

It is a still further object of the present invention to provide a compact precooler between an auto-thermal reformer and low temperature shift converter which provides sufficient residence time to effectively cool the reformer exit gas stream to a desired temperature and evaporate all water used in the precooler.

It is a still further object of the present invention to provide a process for cooling a reformer exit gas stream in an effective manner while limiting pressure drop.

Further objects and advantages of the present invention will appear hereinbelow.

SUMMARY OF THE INVENTION

The foregoing objects and advantages are obtained by way of the present invention by providing, in a near ambient pressure operated auto-thermal reformer fuel gas system, a precooler between the auto-thermal reformer and low temperature shift converter. The precooler includes an atomizing water inlet which also includes an inlet for the reformed gas wherein the inlet for reformed gas comprises a plurality of jets arrayed circularly about the atomizing water inlet and at an acute angle with respect to the longitudinal axis of the precooler so as to create a swirling and recirculating flow of the reformed gas in the cooler thereby increasing the residence time so as to effectively cool the hot reformed gas.

It is noted, however, that other types of fuel processing devices such as thermal steam reformers or partial oxidation devices could benefit from the use of a compact precooler in fuel cell systems incorproating such devices.

The present invention is further drawn to a process for cooling a reformed exit gas from an auto-thermal reformer operated at near ambient pressure so as to ensure a cooled reformed gas at the desired temperature wherein the gas stream is substantially free of water droplets. By vaporizing all the water in the precooler, the process ensures a minimal pressure drop from the inlet of the precooler to the outlet of the precooler.

BRIEF DESCRIPTION OF THE DRAWINGS

Further features and advantages of the present invention will be more fully apparent in light of the following detailed description of the preferred embodiment of the present invention as illustrated in the accompanying drawings wherein.

DETAILED DESCRIPTION

The process of the apparatus of the present invention will be described hereinbelow with reference to FIGS. 1–4.

Figure 1:
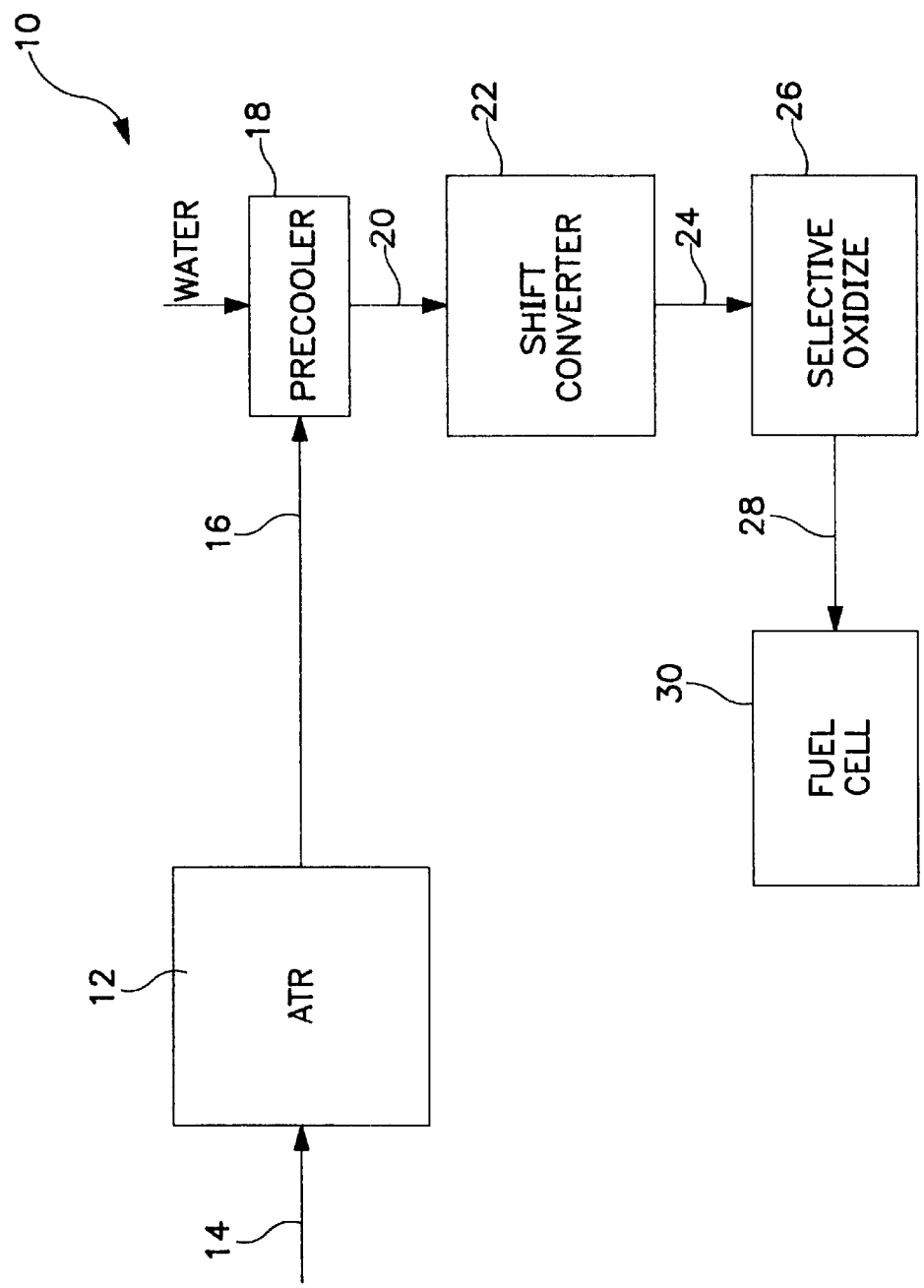
FIG. 1 is a schematic representation of an auto-thermal reformer fuel cell system employing the precooler of the present invention.

FIG. 1 is a schematic representation of an auto-thermal reformer fuel cell system which may employ the precooler of the present invention for carrying out the process of the present invention. It should be appreciated that the precooler may be used in any fuel cell system with a fuel processor using fuel such as natural gas, gasoline, diesel fuel, naphtha, fuel oil and like hydrocarbons. The invention will be described with reference to use in a gasoline fueled auto-thermal reformer fuel cell system.

With further reference to FIG. 1, the fuel cell system 10 includes an auto-thermal reformer 12 which receives through line 14 a gas mixture comprising gasoline, steam and air which is reformed in reformer 12 into a reformed gas comprising primarily nitrogen, hydrogen, carbon dioxide, water vapor and carbon monoxide. The reformed armed gas leaves the reformer through line 16 and enters precooler 18 where the reformed gas is processed in accordance with the present invention in a manner to be discussed hereinbelow. The hot reformed gas discharged from the reformer 12 is at a temperature of between about 600 to 900° F. when entering the precooler 18. The precooler functions to reduce the temperature of the gas stream to a temperature of less than or equal to 500° F. at the outlet line 20 of the precooler prior to introduction into the shift converter 22. The shift converter 22 receives the cooled reformed gas containing nitrogen, carbon dioxide, water vapor, carbon monoxide and hydrogen and processes the reformed gas in the presence of a catalyst to convert the majority of carbon monoxide of the reformed gas such that the gas exiting the shift converter is primarily a gas mixture comprising nitrogen, carbon dioxide and hydrogen. Discharge line 24 feeds the gas mixture to a selective oxidizer unit 26 where any remaining carbon monoxide gas is further reduced and the gas fed by a line 28 to fuel cell 30.

The gasoline fueled auto-thermal reformer fuel cell system which employs the precooler in the present invention is designed to operate at near ambient pressure and with the precooler mounted in a vertical downward orientation. Accordingly, the pressure drop in the system must be controlled in a very precise manner. The pressure drop at the rated power of the fuel cell across the precooler from inlet to outlet should be less than 10 inches of water. In addition, the size of the precooler must be compact for use in a mobile fuel cell system which has limited space capacity. Finally, the precooler of the present invention while being compact and minimizing pressure drop from the inlet to the outlet thereof, must also reduce the temperature of the hot reformed gas to the desired shift converter inlet temperature in order for the system to operate effectively without damaging the catalyst employed in the shift converter. While the precooler was conceived for vehicular fuel cell power plant use, other applications to stationary fuel cell power plants are envisioned.

Figure 2:
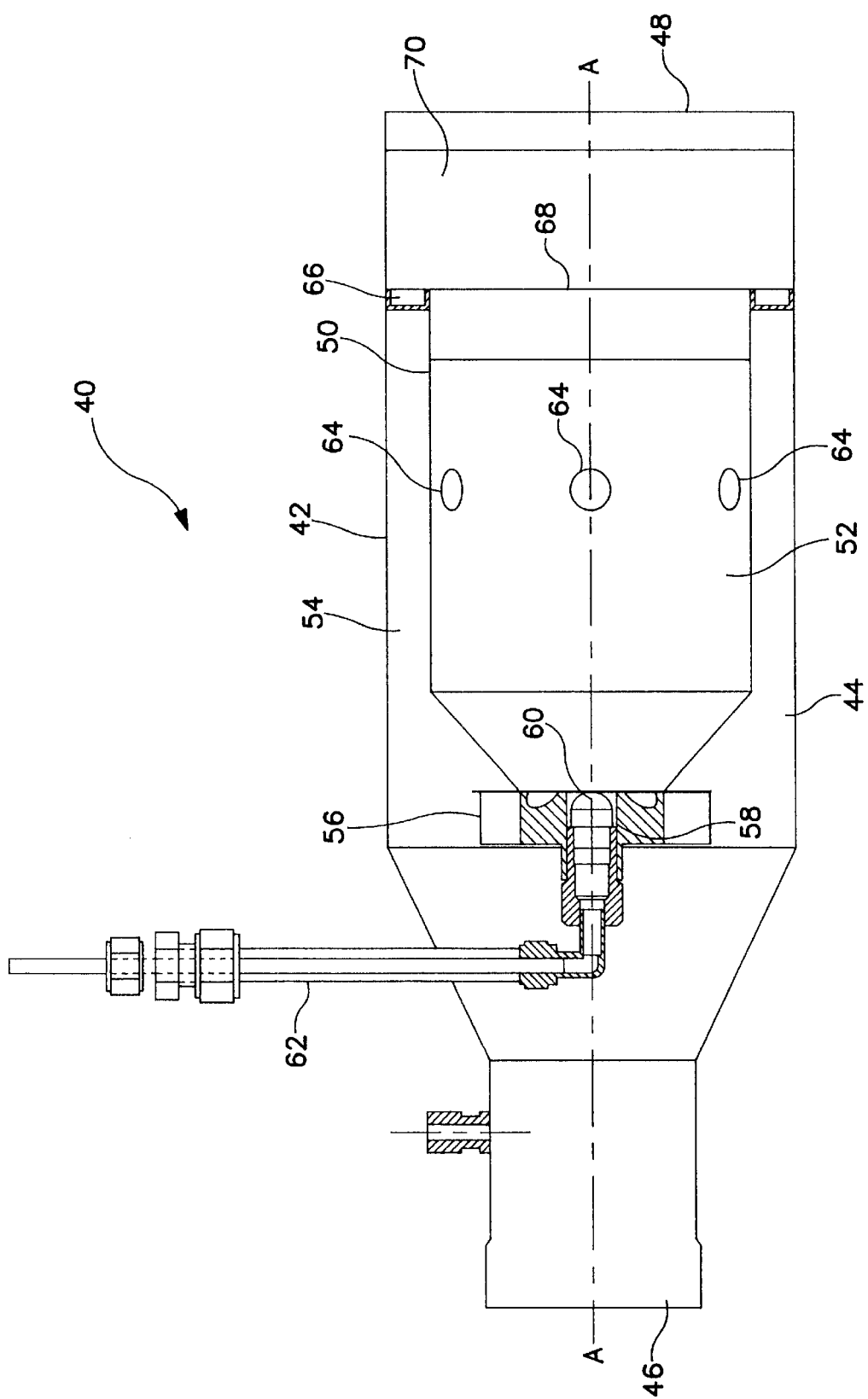
FIG. 2 is a cross sectional view through the precooler in accordance with the present invention.
Figure 3:
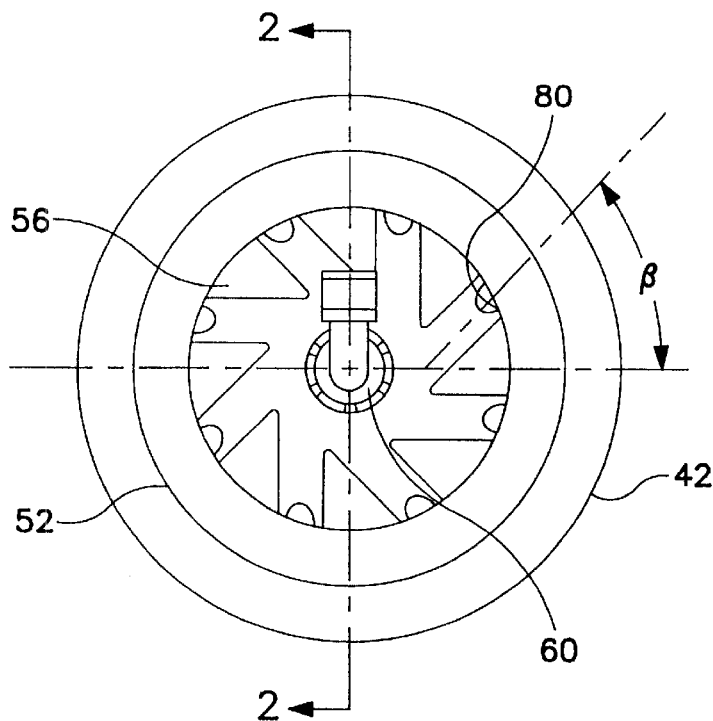
FIG. 3 is a top view of the redirecting hot gas inlet used in the precooler of the present invention.
Figure 4:
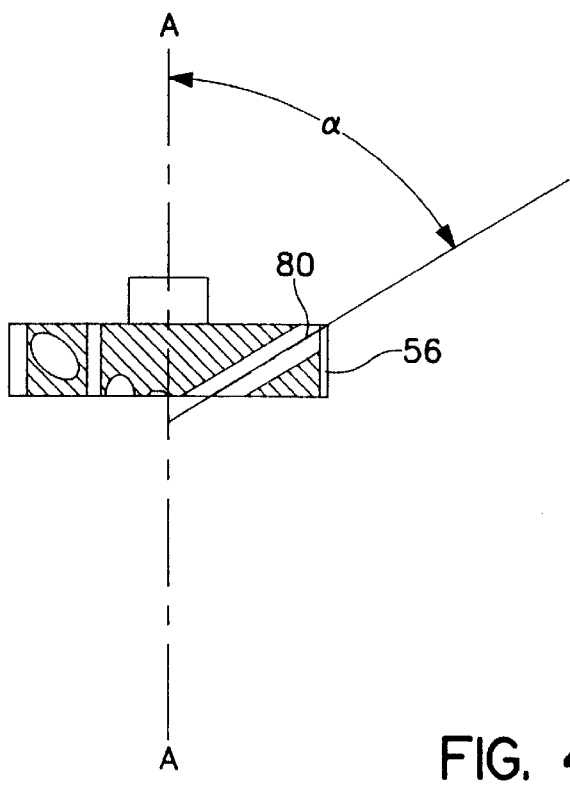
FIG. 4 is a side sectional view of the hot gas inlet used in the precooler of the present invention.

FIGS. 2 through 4 illustrate a precooler design in accordance with the present invention which meets all of the specifications described above with regard to size, pressure drop, and temperature reduction. FIG. 2 is a cross sectional view of the precooler of the present invention. The precooler 40 comprises a housing 42 which defines an elongated chamber 44 which extends about a longitudinal axis A. The housing 42 defines a reformed gas inlet 46 to chamber 44 and a cooled reformed gas outlet 48 for discharge of the cooled reformed gas to the shift converter. Positioned within the housing 42 in the chamber 44 is a sleeve member 50 of diameter d which defines internally a recirculation-cooling zone 52. The sleeve 50 may be supported within chamber 44 in any manner known in the art. The sleeve 50 defines with a portion of the housing 42 an annular space 54. On the upstream side of the sleeve 50 is a disc member (or swirler) 56 which defines a primary hot gas inlet to the recirculation-cooling zone 52. The details of the inlet and disc 56 will be described hereinbelow. As can be seen in FIGS. 2 and 3, the disc is provided with a bore 58 which receives a nozzle 60 connected to a line 62 which in turn is connected to a cool water source, not shown.

Sleeve 50 includes a plurality of holes 64 for communicating annular space 54 with the recirculation-cooling zone. The holes 64 in sleeve 50 are preferably located one sleeve diameter downstream from the mixer nozzle 60. Variations in the holes location can be from 0.5 to 1.5 sleeve diameters with 1.0 diameter being preferred. While only one row of holes has been shown and is preferred, more than one row could be used at different sleeve diameter location between 0.5 and 1.5 d. In addition, rather than rows the holes could be randomly located. A seal 66 is provided in the annular space 64 and seals the annular space in such a manner as to ensure that no hot reformed gas entering inlet 46 may be discharged through outlet 48 without first passing through the recirculatiot cooling zone 52 of the present invention. The hot reformed gas may enter the recirculation-cooling zone 52 through the primary inlet provided in disc 56 or the secondary inlets constituted by bores 64. The percent of gas entering recirculation-cooling zone 52 by swirler 56 compared to gas entering the recirculation-cooling zone 52 through holes 64 is preferably 50/50. Variations in the percent gas split between the two entry points is 25/75 to 75/25 with 50/50 being preferred.

Nozzle 60 atomizes the water introduced into the recirculation-cooling zone for cooling the hot reformed gas therein. The nozzle 60 may take the form of any nozzle known in the art and should be designed to provide water droplets of less than about 100 microns at rated flow conditions which are about 27 lbs./hr. of $H_2O$.

The cooled reformed gas exits the recirculation-cooling zone 52 through cooled gas outlet 68 which communicates the gas to reformed gas outlet 48 of housing 42. A chamber 70 (evaporation zone) is defined between outlet 68 and outlet 48 and, in a preferred embodiment of the present invention, may be packed with a high surface area material which completes vaporization of water droplets in the precooler 40 so as to ensure that no water droplets are in the cooled reformed gas discharged through outlet 48. In addition, the compacted material in chamber 70 also assists in cooling of the reformed gas stream prior to discharge through outlet 48. Suitable materials used in the chamber 70 include steel wool, ceramic and metal pellets, retriculated ceramic foam and metal foam.

As can be seen from FIGS. 3 and 4, disc 56 is provided with a plurality of holes arrayed around central opening 58 which receives the water nozzle 60 as described above. The bores 80 pass through the disc 56 at an acute angle $\alpha$ (see FIG. 4) with respect to longitudinal axis A. The angle is generally between 45° and 85° and preferably about 60°. In addition, the bores or jets 80 are arranged radially about the disc wherein they do not intersect the longitudinal axis A but rather extend through the disc at the acute angle $\beta$ (see FIG. 3) to a point which is substantially tangential to the bore 58 in plate 56. $\beta$ is 45°. In this regard see, particularly, FIG. 3. By arranging the jets 80 in the manner described above, the hot reformed gas entering the inlet through the jets 80 produces a swirling flow in the recirculation-cooling zone 52 which provides ideal mixing of the reformed gas with the atomized water and increases residence time of the reformed gas in the recirculation-cooling zone. In addition, by providing a plurality of inlets 64 in the sleeve 50, hot reform gas entering through the inlet 64 will cause further recirculation of the hot gases and atomized water within the recirculation-cooling zone. The increased residence time which is obtained as a result of the swirling, recirculating flow allows for two important functions. Firstly, the water introduced into the recirculation cooling zone may be effectively vaporized and secondly the reformed gas will be cooled in the desired manner. This is accomplished in a precooler which is compact in nature due to the fact that there is a substantial increase in residence time which allows for the unit to be made smaller.

Furthermore, as noted above, besides obtaining the necessary cooled reformed gas stream, it is desirable to ensure substantially complete vaporization of water in the precooler 40 so as to limit the pressure drop from the inlet 46 to the outlet 48 to not more than 10 inches of water. Complete vaporization of the water is ensured in a precooler of the present invention by (1) increasing residence time and (2) providing a high surface area material in chamber 70. The high surface area material 70 ensures that any water droplets formed on the inside wall of the sleeve 50 due to the swirling flow of the gas will pass down into the material and be vaporized therein prior to passing through outlet 48.

As noted above, the process of the present invention requires the cooling of a hot reformed gas in a precooler from an inlet temperature of between about 600 to 900° F. to an outlet temperature of preferably between 400 to 500° F. In addition, any water used to assist in the cooling of the reformed gas must be completely vaporized within the cooling zone prior to discharge. In order to ensure the foregoing at rated power conditions certain parameters must be maintained. The mass flow rate of reformed gas should be between about 290 to 350 lbs./hr., the mass flow rate of water between 25 to 35 lbs/hr. and the residence time greater than 30 milliseconds and preferably between 30 to 50 milliseconds. The inlet water temperature is desirably between 100 to 150° F. In addition, the surface area of the material in chamber 70 should be between about 400 to 600 ft²/ft³. Also, as noted above, the pressure drop at rated power from the reformed gas inlet to the reformed gas outlet is less than 10 inches of water. The assembly can operate at flow conditions from rated power down to a flow rate of 10% of rated power. At the low flow conditions the increased residence time allows for complete vaporization of the injected water even though the water droplet size may be greater than 100 microns.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A fuel cell system comprising:

a device for converting a hydrocarbon fuel into a high temperature gas containing hydrogen and carbon monoxide;

a shift converter downstream of said converting device for converting the reformed gas to primarily hydrogen and carbon dioxide;

a fuel cell downstream of the shift converter for reacting the hydrogen from the shift converter; and a shift converter precooler upstream of and proximate to the shift converter and oriented in a vertical downward position for cooling the reformed gas to a desired temperature prior to introduction into the shift converter, the precooler comprising: a housing defining an elongated chamber extending about a longitudinal axis, the chamber having a reformed gas inlet and a reformed gas outlet; a sleeve member defining a recirculation-cooling zone mounted in the chamber about the longitudinal axis between the reformed gas inlet and the reformed gas outlet and defining with a portion of the housing an annular space and having at least one hot gas inlet and a cooled gas outlet; a water inlet associated with the at least one hot gas inlet wherein the at least one hot gas inlet comprises a plurality of jets arrayed circularly about the atomizing water inlet and at an acute angle a with respect to the longitudinal axis for creating a swirling recirculating flow of the reformed gas in the recirculation-cooling zone.

2. A system according to claim 1 wherein a seal is located in the annular space for prohibiting flow of reformed gas from the reformed gas inlet directly to the reformed gas outlet.

3. A system according to claim 2 wherein the sleeve member has a diameter d and a plurality of further inlets located at a position between 0.5 and 1.5 d downstream from the nozzle and which communicate the annular space with the recirculation cooling zone.

4. A system according to claim 3 wherein the further inlets are preferably located at 1.0 d from the nozzle.

5. A system according to claim 2 wherein the split of hot reformed gas between the reformed gas inlet and the further inlets is between a ratio of 25/75 to 75/25.

6. A system according to claim 5 wherein the split of hot reformer gas is 50/50.

7. A system according to claim 1 wherein the acute angle α a is between 45° to 850° with respect to the longitudinal axis A.

8. A system according to claim 1 wherein the acute angle is about 60° with respect to longitudinal axis A.

9. A system according to claim 7 wherein the plurality of jets extend radially inward to the water inlet.

10. A system according to claim 9 wherein the plurality of jets nozzles extend substantially tangential to the water inlet.

11. A system according to claim 1 wherein the water inlet comprises an atomizing nozzle.

12. A system according to claim 1 wherein the cooled reformed gas outlet is spaced from the cooled gas outlet and defines therebetween and within the housing an evaporation zone.

13. A system according to claim 12 wherein the separation zone contains a material of high surface area.

14. A system according to claim 13 wherein the material is selected from the group consisting of steel wool, ceramic pellets, retriculated ceramic foam and metal foam.

* * * * *

UNITED STATES PATENT AND TRADEMARK OFFICE
CERTIFICATE OF CORRECTION

PATENT NO. : 6,548,198 B2
DATED : April 15, 2003
INVENTOR(S) : Peter F. Foley et al.

It is certified that error appears in the above-identified patent and that said Letters Patent is hereby corrected as shown below:

Column 5,
Line 22, "device" should be corrected to -- reformer --
Line 23, after "temperature" insert the word -- reformed --.
Line 25, "converting device" should be corrected to -- reformer --.
Line 26, after "primarily" insert -- a --.
Line 27, after "dioxide" and before the ";" insert -- $\alpha$ --. -- containing gas stream --.
Line 29, after "hydrogen" insert -- in the gas stream --.

Column 6,
Line 3, "a" should be corrected to -- $\alpha$ --.
Line 24, "850º" should be corrected to -- 85º --.

Signed and Sealed this

Third Day of August, 2004

JON W. DUDAS
*Acting Director of the United States Patent and Trademark Office*